March 20, 1945.　　　W. J. CALDWELL　　　2,371,735
POWDERED FUEL FEEDING SYSTEM FOR INTERNAL-COMBUSTION ENGINES
Filed June 1, 1943　　　2 Sheets-Sheet 2
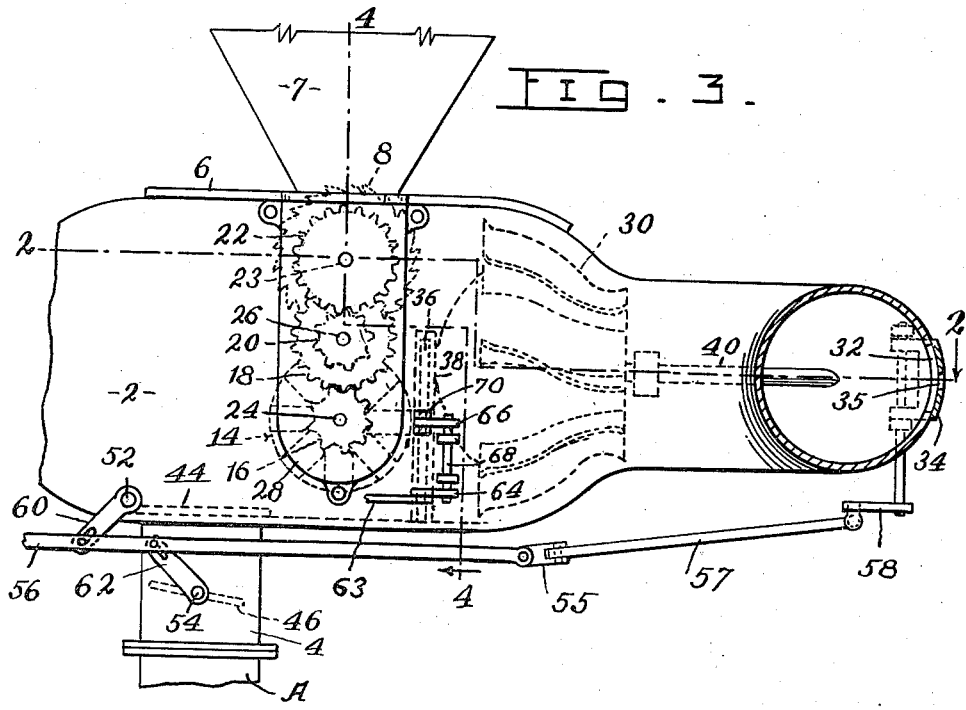
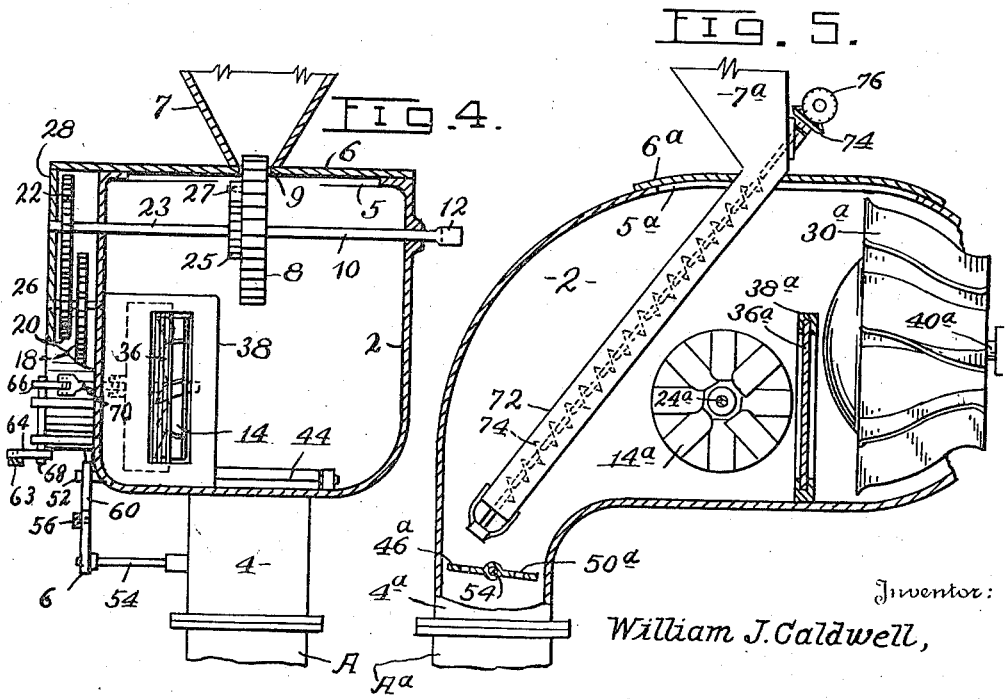
Inventor:
William J. Caldwell,
By F. G. Fischer,
Attorney.

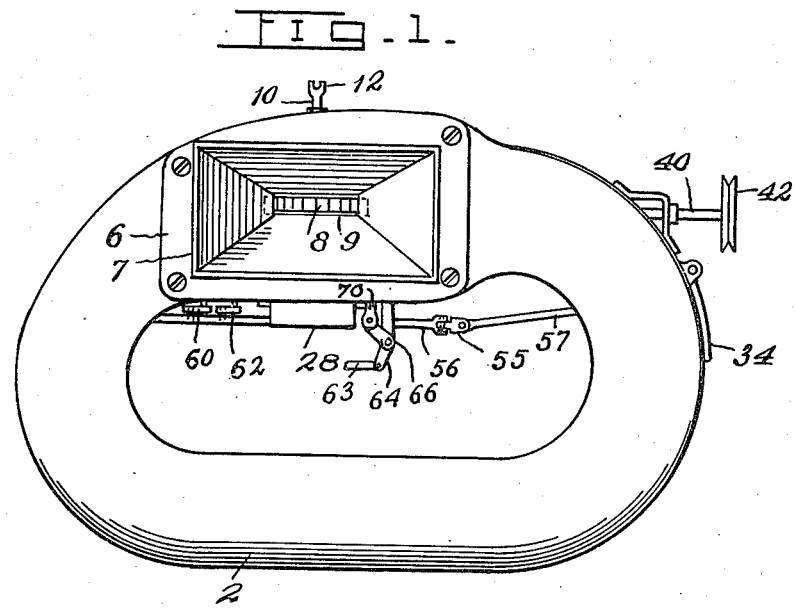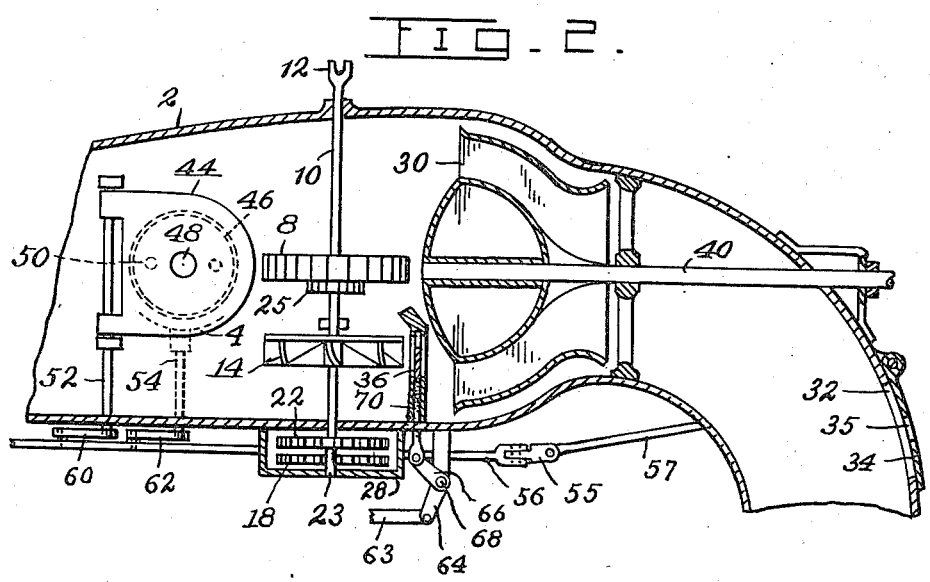

Patented Mar. 20, 1945

2,371,735

UNITED STATES PATENT OFFICE 2,371,735

POWDERED FUEL FEEDING SYSTEM FOR INTERNAL-COMBUSTION ENGINES

William J. Caldwell, Independence, Mo.

Application June 1, 1943, Serial No. 489,300

8 Claims. (Cl. 302—36)

My invention relates to a new and useful system in which an explosive fuel in powdered form is utilized instead of gasoline and other volatile fluid hydrocarbons in the operation of internal combustion engines of the reciprocatory and turbine types.

The fuel may be produced at low cost from combustible minerals and vegetation, such, for example, as charcoal, flour dust, sawdust, coal dust, etc. Much of the foregoing, being in the form of waste material, can be had at the cost of collection and transportation to a central plant for dehydration and pulverization to provide a highly explosive fuel when compressed and ignited in an internal combustion engine in the presence of a proper supply of air.

The present invention relates more particularly to a system in which the powdered fuel may be fed to an internal combustion engine either uniformly or in variable amounts as required by the load and speed at which the engine is operated, said system including both manually and automatically operated devices whereby feeding of the fuel to the engine can be regulated to obtain the most efficient results. The system also includes means for supplying variable amounts of air under variable pressures for intimate contact with the fine fuel particles to separate such particles from each other and introduce them into the engine preparatory to ignition of the fuel in the combustion chamber or chambers of the engine.

Other features will hereinafter appear and in order that the invention may be fully understood, reference will now be had to the accompanying drawings, in which:

Fig. 1 is a plan view of the invention.

Fig. 2 is an enlarged horizontal section on line 2—2 of Fig. 3.

Fig. 3 is a broken side elevation with one of the parts in section.

Fig. 4 is a vertical cross section on line 4—4 of Fig. 3.

Fig. 5 is a broken vertical section of a modified form.

Referring in detail to the different parts comprising the system, 2 designates a fuel chamber preferably arranged in the form of a tubular loop provided with a flanged outlet 4 adapted to be connected to the intake manifold A, or the booster supercharger of the engine (not shown).

Access may be had to the interior of the fuel chamber 2 through an opening 5 for inspection and adjustment of mechanism hereinafter described. A removable plate 6, which normally closes the opening 5, is surmounted by a hopper 7 adapted to hold a supply of powdered fuel which is automatically fed into the chamber 2 as needed by any appropriate feed mechanism including, in the present instance, a toothed feed-wheel 8 projecting upward into the hopper through an inlet slot 9 in the plate 6. The feed-wheel 8 is located in the fuel chamber 2 and mounted upon a shaft 10, extending through one side of the fuel chamber 2 and provided at its outer end with a coupling 12, so that it may be manually operated with a crank (not shown), in the event an emergency should arise requiring such operation.

The feed-wheel 8 may be driven by any appropriate means. In the present instance such means comprises an air motor 14 which drives the feed-wheel through the medium of a speed reduction train comprising a pinion 16, a relatively large spur gear 18, a small spur gear 20, and a relatively large spur gear 22. The air motor 14 and the pinion 16 are fixed upon a drive shaft 24, the gears 18 and 20 are fixed upon an intermediate shaft 26, and the gear 22 is fixed upon a shaft 23. Normally the shaft 23 drives the feed-wheel 8 through a ratchet-wheel 25, fixed thereon, and a spring-pressed pawl 27 pivotally mounted upon the feed-wheel so that the latter can be manually cranked, as above mentioned, without also operating the speed reduction train and the air motor 14. The gears 16, 18, 20 and 22 are preferably enclosed in a gear box 28 removably mounted on the exterior of the fuel chamber 2.

The air motor 14 is located in the fuel chamber 2, in advance of the outlet 4, and driven by an air blast preferably created by a blower 30, which is also located in the fuel chamber 2 and through suction, draws in the outer atmosphere through an air port 32 located in the forward portion of the fuel chamber and controlled by a valve 34 provided with an air port 35. An adjustable air cut-off 36, slidably mounted in guide means 38, located in the fuel chamber, is interposed between the air motor 14 and the blower 30 to regulate the flow of air against the former and thereby control the speed thereof. The blower 30 is fixed upon a rotary shaft 40 which extends outward through the front portion of the feed chamber 2 and is provided with a pulley 42, which may be driven by an engine auxiliary such, for instance, as the belt of the cooling fan (not shown). The discharge end of the blower 30 is larger diametrically than the intake end to accelerate the incoming air and create a blast that will operate the air motor 14, separate the fuel particles from each other as they are discharged into the fuel chamber by the feed-wheel 8, supercharge the engine with a portion of the fuel and circulate the remainder through the fuel chamber 2 to provide a deposit which will enable quick starting of the engine when the latter is cranked and the associated ignition switch, not shown, is closed.

Passage of fuel from the fuel chamber 2 through the outlet 4 to the engine is controlled by a main valve 44 and a butterfly valve 46 provided with ports 48 and 50 and fixed upon spindles 52 and 54, respectively. The butterfly valve 46 is located inside of the outlet 4, while the main valve 44 is located at the entrance to the outlet so that when opened it will direct a mixture of air and fuel into said outlet. All of the valves and the cut-off 36 may be operated simultaneously if desired, but in the present instance I have disclosed means whereby only the valves are operated simultaneously, comprising a common connecting rod 56 which may be controlled by the driver through any suitable mechanism such, for example, as the conventional throttle lever (not shown) with which automotive engines are equipped. The connecting rod 56 may comprise only one member or it may include additional members 55 and 57 to render its forward portion flexible for connection to the air valve lever 58. The connecting rod 56 is also operably connected to levers 60 and 62 fixed at one end upon the spindles of the respective valves 44 and 46. The cut-off 36 is operated by a connecting rod 63 through levers 64 and 66 mounted upon a shaft 68, and a link 70 connected to the lever 66 and the cut-off.

Briefly the operation is as follows:

Preparatory to starting the engine, the cut-off 36 is opened by advancing the connecting rod 63 and the valves 34, 44 and 46 are opened by advancing the connecting rod 56. The instant the engine is started the blower 30 creates an air blast, a portion of which impinges against and operates the air motor 14, which in turn operates the feed-wheel 8 through the medium of the gear wheels 16, 18, 20, 22, the ratchet-wheel 25 and the pawl 27. The feed-wheel 8 then feeds the pulverized fuel from the hopper 7 down into the fuel chamber 2, from which fuel and air is blown by the air blast through the outlet 4 to the engine in such quantities as required for the proper operation of the engine.

When the temperature of the engine reaches such degree as to insure efficient operation, the connecting rod 56 may be retracted to partially close the valves 34, 44 and 46, and the connecting rod 62 may also be retracted until the cut-off 36 partially covers and thereby reduces the speed of the air motor 14 which in turn reduces the speed of the feed-wheel 8 so that it will feed less fuel to chamber 2. If it is desired to have the engine idle the valves are closed. This shuts off all fuel from the engine, excepting the relatively small portion which flows through the ports 48 and 50 and also shuts out the air excepting the reduced flow entering through port 35. When the main valve 44 is either partially or completely closed the major portion of the fuel entering thereafter into the fuel chamber 2 is circulated around therein by the blower 30, thereby building up a fuel reserve to insure smooth operation of the engine and also easy starting and quick acceleration.

In the modified form disclosed by Fig. 5, some of the parts are similar to those hereinbefore described as is evidenced by corresponding reference numerals with exponents $a$, the chief difference residing in the fuel feed means which consists of a conveyer comprising a tube 72 and a screw 74 operating in said tube to conduct powdered fuel from the hopper 7a to a point adjacent to the outlet 4a. The screw 74 is operated by bevel gears 74 and 76, which in turn may be operated by the air motor 14a through suitable means such, for instance, as the reduction train of gears best shown by Fig. 3.

From the foregoing description, taken in connection with the accompanying drawings, it is apparent that the fuel system above described is efficient and well adapted for the purpose intended, and while two forms of the system have been described in detail it is apparent that other changes and modifications may be made in the construction, combination and arrangement of parts as properly fall within the scope of the invention as claimed.

Having thus described my invention, what I claim and desire to secure by Letters Patent, is:

1. A powdered fuel feeding system for combustion engines, comprising a chamber having a fuel outlet adapted to be connected to the fuel inlet of an engine, means including an air motor in the chamber for feeding powdered fuel to the latter, and means for creating an air blast within the chamber to operate said air motor and force the fuel through said outlet.

2. A powdered fuel feeding system for combustion engines, comprising a chamber having a fuel outlet adapted to be connected to an engine, a feed-wheel in the chamber for feeding powdered fuel to the latter from a source of supply, an air motor in the chamber, a speed reduction train of gears through which said air motor drives the feed-wheel, and means in the chamber for creating an air blast therein which operates the air motor and blows the fuel through said outlet.

3. A fuel system comprising a chamber having an outlet, rotary means for feeding dry fuel into said chamber, a blower for creating an air blast within the chamber to blow the fuel through the outlet, an air motor in the chamber operated by the air blast and adapted to drive the rotary feed means, and adjustable means in the chamber interposed between the blower and the air motor to regulate the flow of air against the latter.

4. A powdered fuel feeding system for combustion engines, comprising a chamber having an outlet adapted to be connected to an engine, a feed-wheel in the chamber for feeding powdered fuel thereto from a source of supply, an air motor in the chamber, a speed reduction train of gears through which said air motor drives the feed-wheel, a pawl and ratchet-wheel interposed between the train of gears and the feed-wheel to permit independent operation of the latter when being manually cranked, means for manually cranking the feed-wheel, and means for creating an air blast in the chamber to operate the air motor and blow the fuel through said outlet.

5. A fuel system comprising a tubular fuel chamber having an air inlet and a fuel outlet, means in the fuel chamber for feeding fuel thereto, means in the fuel chamber for operating the fuel feeding means, and means in the fuel chamber for creating an air blast which mixes with and circulates the fuel and drives the means that operates the fuel feeding means.

6. A fuel system comprising a tubular fuel chamber having an air inlet and a fuel outlet, means in the fuel chamber for feeding fuel thereto, means in the fuel chamber for operating the fuel feeding means, means in the fuel chamber for creating an air blast which mixes with and circulates the fuel and drives the means that operates the fuel feeding means, a valve in the fuel chamber adapted when opened to deflect a portion of the fuel to the outlet, and means for operating said valve.

7. A fuel system comprising a tubular fuel chamber having an air inlet and a fuel outlet, means in the fuel chamber for feeding fuel thereto, means in the fuel chamber for operating the fuel feeding means, means in the fuel chamber for creating an air blast which mixes with and circulates the fuel and drives the means that operates the fuel feeding means, a valve for controlling the air inlet, a valve in the fuel chamber for controlling the fuel outlet, and manual means whereby said valves can be controlled at a distal point from the valves.

8. A fuel system comprising a fuel chamber in the form of a loop having a valve controlled air inlet and a fuel outlet, rotary means for feeding fuel into said fuel chamber, rotary means in the fuel chamber for operating the fuel feeding means, means for creating an air blast which mixes with and circulates the fuel in said fuel chamber and drives the rotary means which operates the fuel feeding means, guide means in the fuel chamber between the blast creating means and the rotary means for operating the fuel feeding means, a cut-off in the fuel chamber slidably associated with said guide means to regulate the flow of the air blast against the rotary means which operates the fuel feeding means, and means for operating said cut-off.

WILLIAM J. CALDWELL.